United States Patent [19]

Narukawa et al.

[11] 4,433,020

[45] Feb. 21, 1984

[54] SHEET-LIKE MATERIAL, HEAT-INSULATING MATERIAL DERIVED THEREFROM AND METHODS OF MANUFACTURING SAME

[75] Inventors: Hiroshi Narukawa; Rentaro Tada; Yasuhira Takeuchi; Osamu Ohara, all of Kurashiki, Japan

[73] Assignee: Kuraray Co., Ltd., Kurashiki, Japan

[21] Appl. No.: 435,638

[22] Filed: Oct. 21, 1982

[30] Foreign Application Priority Data

Oct. 22, 1981 [JP] Japan ................................ 56-169540
Apr. 14, 1982 [JP] Japan ................................ 57-62782

[51] Int. Cl.$^3$ ................................................. B32B 5/12
[52] U.S. Cl. ................................... 428/113; 162/154; 428/283; 428/288; 428/323; 428/408; 428/443; 428/902; 428/920
[58] Field of Search ............... 428/113, 285, 288, 290, 428/293, 299, 301, 302, 323, 408, 443, 902, 283, 910, 920; 162/159

[56] References Cited

FOREIGN PATENT DOCUMENTS 56-112594  9/1981  Japan ................................... 162/159

*Primary Examiner*—James J. Bell
*Attorney, Agent, or Firm*—Barry Kramer

[57] ABSTRACT

A sheet-like material having excellent fire resistance and bending workability comprises 80 to 97% by weight of a non-flammable fibrous substance, and 3 to 20% by weight of a binder consisting essentially of a thermoplastic resin. The fibrous substance is orientated at an angle of 3° to 80°. The material has an intermediate layer containing at least 2% by weight of the binder and at least 25% of the average quantity of the binder in the material. A heat insulating material comprising such sheet-like materials is also disclosed. The sheet-like material, and the heat insulating material are manufactured by a wet sheet forming process in which a slurry containing the fibrous substance and the binder is fed to a carrier net or sheet at an angle of 5° to 60° thereto, whereby the fibers are orientated. Alternatively, the slurry is fed to the carrier net or sheet at an angle of 20° to 45°, while a fluid is blown into the slurry to create turbulence therein.

33 Claims, No Drawings

SHEET-LIKE MATERIAL, HEAT-INSULATING MATERIAL DERIVED THEREFROM AND METHODS OF MANUFACTURING SAME

BACKGROUND OF THE INVENTION

1. Field of the Invention

This invention relates to a sheet-like material having excellent fire resistance and bending workability, to a heat-insulating material derived therefrom and to methods of manufacturing same.

2. Description of the Prior Art

The recent search for energy saving devices has promoted the use of various types of heat-insulating materials for a wide variety of applications. They include organic foams, such as polyurethane or polystyrene foam, which are seriously defective in fire resistance. A heat-insulating material composed of inorganic fibers, such as glass fibers or rock wool, is mainly used for a building or facility which is exposed to the danger of a fire. These inorganic heat-insulating materials, however, usually contain no binder, or only a very small quantity of phenol resin which adheres non-uniformly to the inorganic fibers. They are, therefore, very fragile, and difficult to handle, though they are excellent in heat-insulating properties. They are unusable for a corrugated roof, or any other application involving rough handling. For use in any such application involving rough handling, therefore, there has been proposed a sheet-like material compound of inorganic fibers joined together by various types of binders, and having a thickness of, say, 5 to 25 mm, and an appropriate degree of bending workability. All of these sheet-like materials have, however, hitherto been manufactured by a dry process. They contain only a small quantity of a binder which fails to uniformly cover the surfaces of inorganic fibers. They have an intermediate layer in which no binder is present. Accordingly, the sheet-like materials hitherto do not improve the inherent brittleness of inorganic fibers. They are, for example, unusable for the heat insulation of a corrugated roof, since the fibers are crushed and broken when they pass through corrugating rolls.

A wet process for preparing a sheet of paper or board from inorganic fibers has been widely used in the manufacture of glass or asbestos paper, rock wool ceiling boards, asbestos slated, or the like. All the products of the conventional wet process in paper or board form, however, contain only a small quantity of a binder. The products in paper form are brittle, low in bending workability, thin, and deficient in heat insulating properties, though they are flexible. The boards lack flexibility, and are brittle and inferior in heat insulating properties, and unusable for a corrugated roof, or the like, though they are satisfactory in strength. In order to improve these defects, Japanese Patent Publication No. 43485/1974, for example, has proposed a wet process for making a sheet-like material by dispersing rock wool with the aid of a specific surfactant. The mere improvement of dispersibility of rock wool is, however, insufficient for drastically improving the basic properties of a sheet-like material. Moreover, the proposed process does not provide any solution to the breakage of inorganic fibers, since it utilizes an opening and dispersing machine which is used in a conventional papermaking process employing a pulp material, such as a pulper or beater. The sheet-like material obtained by the proposed process is nothing better than a paper-like material.

SUMMARY OF THE INVENTION

It is an object of this invention to provide a sheet-like material having fire resistance and bending workability.

It is another object of this invention to provide a heat-insulating material composed of such sheet-like material, and having excellent fire resistance and bending workability.

It is a further object of this invention to provide a method of manufacturing such a sheet-like material, and a heat-insulating material composed of such a sheet-like material.

These objects are attained by a sheet-like material comprising 80 to 97% by weight of a non-inflammable fibrous substance, and 3 to 20% by weight of a binder consisting essentially of a thermoplastic resin, the fibrous substance having an interlayer orientation degree of 3° to 80°, the sheet-like material having an intermediate layer containing the binder in a quantity which is at least 2% by weight and said binder is present in said intermediate layer in an amount which is at least 25% of the mean quantity of the binder throughout the sheet-like material.

The present invention also provide a heat-insulating material composed of such sheet-like material.

The present invention further provides a wet process for the manufacture of sheet like-material, or heat-insulating material which comprises dispersing a non-inflammable fibrous substance, a binder, a cross-linking agent and a coagulant in water to prepare a slurry, and feeding the slurry at an angle of 5° to 60° to a carrier net, or blowing a fluid into the slurry to cause turbulence therein, and feeding it at an angle of 20° to 45° to the carrier net.

DETAILED DESCRIPTION OF THE INVENTION

Examples of the non-inflammable fibrous substances which can be employed in this invention include asbestos, rock wool, glass fibers, aluminum silicate or other ceramic fibers, aluminous fibers, and carbon fibers. It is also possible to use any other fibrous substance if it does not melt or burn at a temperature below 500° C., and if it is composed of fibers having an average diameter of 0.1 to 20 microns, and an average length of 1 to 30 mm. If asbestos is used, it is advisable to choose one having the maximum possible fiber length. Rock wool is an optimum material for the purpose of this invention. It is possible to use rock wool prepared either from natural rock or from a slag. It is advisable to use rock wool containing only a small quantity of granules. It is possible to use rock wool prepared from granular or stratified wool. If glass fibers are used, it is possible to use fibers prepared from chopped strands or glass wool. According to this invention, it is possible to substitute organic fibers partially for a non-inflammable fibrous substance in order to obtain improved elasticity, bending workability and itching resistance if a satisfactory level of fire resistance can be maintained. In this connection, it is possible to use, for example, poly(vinyl alcohol) fibers, rayon, acrylic fiber, nylon, polypropylene, vinyl chloride or ester fibers.

According to this invention, a binder consisting essentially of a thermoplastic resin is employed to cover the surfaces of the inorganic fibers and promote their intertwining to obtain a sheet-like material having improved strength, resiliency and workability. It is advisable to use a binder which can be dissolved or dispersed in water, i.e., a water-soluble high molecular substance, or an emulsion or latex resin. It is possible to use any of a wide variety of synthetic and natural water-soluble high polymers, including polyvinyl alcohols, polyacrylic acids, polyethylene oxide, carboxylmethyl cellulose, casein and starch. If an emulsion or latex resin is preferred, it is possible to use, for example, polyvinyl acetate or a copolymer thereof, polyvinyl chloride or a copolymer thereof, polyacrylic acid ester or a copolymer thereof, polyethylene or a copolymer thereof, or a polyurethanepolymer, as well as a hydrosol such as of an ethylene-acrylate copolymer.

In order to obtain a sheet-like material to which flexibility and bending workability are of particular importance, it is advisable to use a binder comprising a thermoplastic resin having a glass transition temperature of $-50°$ C. to $30°$ C., for example, an ethylene-vinyl acetate copolymer, a plasticized vinyl chloride-vinyl acetate copolymer, a polyurethane, or an acrylic or methacrylic acid ester copolymer. The glass transition temperature of a particular resin can be determined by, for example, a testing method for the shearing elastic modules and mechanical attenuation of plastics employing a torsional pendulum as specified by JIS K7213, or by employing a vibron or like apparatus, whereby it is possible to obtain the transition temperature of its elastic modulus, or the peak temperature of its mechanical attenuation.

Of particular importance to this invention is the distribution of the binder across the thickness of the sheet-like material. Only a sheet-like material having a binder distribution in the range as hereinbefore specified can withstand rough handling during the corrugating or like operation. The skins of the sheet-like material are required to contain a somewhat larger, or at least an approximately equal quantity of the binder, than or to that of the binder in an inner layer in order to protect against rubbing by corrugating rollers, and rough handling, and maintain a satisfactory level of weathering quality. The lower limit to the quantity of the binder in the intermediate layer is determined by its ability to cover the inorganic fibers uniformly to protect them from being crushed during corrugation, while its upper limit depends on the fire resistance required of the sheet-like material. More specifically, a sheet-like material having a relatively uniform binder distribution is acceptable which contains 3 to 20%, or preferably 4 to 15%, by weight of the binder, and of which the intermediate layer contains the binder in a quantity which is at least 2% by weight and at least 25% of the mean quantity of the binder across the entire thickness of the sheet-like material.

The distribution of the binder across the thickness of a sheet-like material may be determined as follows:

A number of columns having a diameter of 20 to 50 mm are cut from a stretched sheet-like material A. Each column is sliced into n (n=3 to 8) layers having an equal thickness, whereby layers Nos. 1 to n are obtained. Layers No. 1 and n are the surface layers, and layers Nos. 2 to n−1 are intermediate layers. The layers having the same number are gathered from all the columns, and samples Nos. 1 to n are obtained. The samples are left in a desiccator for one day and night. Then, they are placed in separate porcelain crucibles, and burned in an electric furnace at 550° C. to 600° C. for 30 to 60 minutes. A reduction in weight of the sample consisting of m-th layers, or layers No. m is represented as Am% by weight. A reduction in weight of layers No. m is determined in the same way for a sheet-like material B prepared without employing any binder at all, and expressed as Bm% by weight. Thus, the quantity of the binder in layer No. m of the sheet-like material A can be obtained by the equation:

$$Xm = Am - Bm$$

In the event a sheet-like material does not contain any organic matter except the binder, Xm may be equal to Am. The quantity of the binder in the entire sheet-like material is obtained as an average quantity for layers Nos. 1 to n, and the quantity of the binder in the intermediate layers as an average value for layers Nos. 2 to n−1.

According to this invention, it is also important to employ an appropriate crosslinking agent in order to prevent the migration of the binder to the surfaces of the sheet-like material to maintain a satisfactory binder distribution, and improve its water resistance, weatherability and strength. In some cases, it is possible to obtain the effect of a crosslinking agent by employing a thermoplastic resin which can under certain conditions undergo an appropriate crosslinking or solidifying action itself, for example, a self-crosslinking type emulsion or a thermosensible solidifying latex. The selection of the crosslinking agent depends on the thermoplastic resin employed. For a polyvinyl alcohol polymer, it is possible to use, for example, an isocyanate compound, a urea compound, boric acid or salt thereof, a zirconica compound, or a titanic acid compound. For a polyvinyl acetate emulsion or a polyacrylic ester emulsion, it is possible to use, for example, a modified polyamideimide epoxy resin or an isocyanate emulsion. The quantity of the crosslinking agent depends on its efficacy, but may generally be in the range of 0.1 to 30% by weight of the binder. The crosslinking agent may be incorporated either in the form of an aqueous solution in which it is mixed with a thermoplastic resin, or by impregnation into a sheet-like material.

According to this invention, it is advisable to employ an appropriate flame retarder to improve drastically the fire resistance and retardancy of the sheet-like material. In order to obtain an excellent fire retarding result, it is particularly advisable to employ a combination of 5 to 50 parts by weight of an antimony compound and 10 to 100 parts by weight of an aromatic bromine compound for 100 parts by weight of the binder. The antimony and bromine compounds preferably have a weight ratio of 1:1 to 1:10. As for the antimony compound, it is possible to use antimony trioxide, pentachloride, trichloride or trisulfide, or a mixture thereof. With respect to the aromatic bromine compound, it is advisable to use a compound having a decomposition temperature of above 280° C., and containing at least 50% by weight of bromine. Suitable examples include tetrabromobenzene, pentabromomethylbenzene, hexabromobenzene, hexabromodiphenylether, decabromodiphenylether, and tetrabromobisphenol A, and mixtures thereof. A sheet-like material containing any such flame retarder, particularly one having a binder content in the range of 4 to 8% by weight, has the highest level of fire resistance that makes it acceptable as a "non-inflammable material" in accordance with the test specified by Japanese Ministry of Construction Notice No. 1828 of 1970, despite the use of an organic binder. A corrugated roof structure emloying any such sheet-like material for heat insulating purposes has the highest level of fire retardancy that renders it acceptable as a "roof capable of fire retardation for 30 minutes" in accordance with the test specified by Japanese Ministry of Construction Notice No. 2999 of 1969.

According to this invention, the interlayer orientation of the fibrous substance in the sheet-like material is as important as the quantity of the binder therein and its distribution across the thickness of the material. It is essential that the fibrous substance have an interlayer orientation of 3° to 80°. The interlayer orientation of the fibrous substance may be determined as will hereinafter be set forth. A metal plate is bonded to each of the front and rear surface of a sheet-like material by an adhesive. Each metal plate is held by a chuck, and an ordinary cleavage strength test in conductance by raising a crosshead at a constant speed to produce cleavage in the laminar interface in which the non-inflammable fibrous substance is orientated. Then, the angle between the metal plate surfaces and fractured surface is measured to determine the interlayer orientation of the fibrous substance. The orientation is an important factor which determines the apparent density, handling property, heat insulating property, fire resistance, sound resistance and condensation resistance of the sheet-like material. The orientation is nearly zero in a paper-like material obtained by the conventional techniques. It is inferior in interlayer strength, though it is strong in a plane which is in parallel to its front and rear surfaces. It is difficult to obtain a sheet-like material having a low apparent density. There is commercially available a heat insulating piping bracket composed of certain cut lengths of rock wool but together to define the thickness of the material. This material has an interlayer orientation of 90°, and is very low in apparent density and high in bending workability, but is too brittle to withstand rough handling. According to this invention, therefore, the fibrous material is required to have an interlayer orientation of 3° to 80°. In a thin sheet-like material having a thickness of 0.5 to 25 mm and an apparent density of 0.08 to 0.4 g/cm$^3$, the fibrous substance is required to have an orientation of 5° to 30°, or preferably 10° to 30°. In a thick sheet-like material having a thickness of 0.5 to 50 mm and an apparent density of 0.04 to 0.2 g/cm$^3$, the fibrous substance is required to have an orientation of 31° to 80°, or preferably 40° to 70°.

According to this invention, it is further possible to add or apply a coloring agent such as a dye or pigment, a mildewcide and a water repellent to the sheet-like material to improve it quality as a heat insulating material, or a building material. In order to obtain a further improved fire resistance, it is possible to add a filler such as aluminum hydroxide, calcium sulfate dihydrate, borax or calcium carbonate. In order to reduce the weight of the sheet-like material, it is possible to employ a light filler such a pearlite, sirasu ballons, expanded vermiculite, hollow beads or mica.

According to this invention, it is possible to combine a sheet-like reinforcing material with an intermediate layer or surface of the sheet-like material to improve its strength, water resistance, fire resistance and moisture resistance. It is advisable to use a film of appropriate material or a metal foil if moisture and water resistance is particularly important. If moisture permeability and hygroscopicity are required, however, it is suitable to use a porous material, such as cloth, paper, cheese cloth, nonwoven fabric or a net. The reinforcing material may be either bonded to a preformed sheet by an adhesive, or combined with a sheet during its production by the wet process. A reinforcing material such as cloth, paper or a nonwoven fabric is preformed, and combined with a sheet during the production of a latter.

The sheet-like material of this invention can be manufactured by the following process:

A slurry is prepared by dispersing uniformly in water pre-determined quantities of a non-inflammable fibrous substance, as well as organic fibers and various kinds of additives if required, a binder consisting essentially of a water-soluble thermoplastic resin, or an emulsion or latex resin, and a crosslinking agent for the resin, or a high polymer coagulant, such as polyacrylamide, polyethyleneimine or sodium polyacrylate. In order to achieve improved dispersion, it is possible to add a surfactant. In order to achieve improved dehydration, it is possible to employ a foam stabilizer to control the quantity of the binder in the sheet-like material. It is usually effective to use a nonionic surface active agent as the foam stabilizer. The resin causes some foaming in the slurry. The foam stabilizer is added to finely divide the foams, and form appropriate water films among the fibrous substance during vacuum dehydration to retard the flow of air and thereby maintain a constant rate of dehydration. It is advisable to effect dispersion relatively slowly by employing a chest or the like, since strong beating and dispersion by a beater or the like results in the breakage of the fibrous substance, and its formation in a spherical mass. The non-inflammable fibrous substance and the binder are both preferably employed in a quantity of 0.1 to 5% by weight, and their quantity depends on the purpose for which the sheet-like material is used. The slurry is conveyed from its tank to a sheet-making station by a slurry pump of a construction which does not form the fibrous substance into a spherical mass, or by dropping by gravity. The slurry is fed onto a traveling or rotating carrier net or porous carrier sheet at an angle of 5° to 60°, or preferably 20° to 45° to form a wet mat on the carrier net or sheet. The white water passing down through the carrier net or sheet, and containing the binder is returned with the white water resulting from dehydration to the slurry tank for reuse to prepare the slurry. The process hereinabove described produces a sheet-like material having a thickness of 0.5 to 25 mm, and an apparent density of 0.08 to 0.04 g/cm$^3$. Alternatively, a liquid or gas may be blown into the slurry to create turbulence therein, while the slurry is being fed at a certain angle as hereinabove set forth, whereby a sheet-like material having a thickness of 0.5 to 50 mm and an apparent density of 0.04 to 0.2 g/cm$^3$ is obtained. It is possible to obtain a different orientation of the fibrous substance if the mode and intensity of the turbulence are varied.

The wet mat is then subjected to vacuum dehydration. The prior art of making rock wool ceiling boards and asbestos slates employs a roller press for dehydration, and for achieving thickness control and surface smoothness, and producing a surface pattern. This invention, however, employs vacuum dehydration, since the use of a roller press fails to produce a sheet-like material which is light in weight and superior in bending workability. The wet mat, which contains about 5 to 8 times as much water as the solid material, is transferred to a vacuum dehydration zone alone or with the carrier net or sheet. After dehydration through one or both surfaces of the mat, it is transferred to a drying zone. Although a high rate of dehydration economically shortens the drying time, it is advisable to dehydrate the mat to the extent that it eventually contains 0.5 to 2 times as much water as the solid material, since excessive dehydration produces a nonrecoverable sheet having a high specific gravity. The fine foams in the mat serve effectively to produce a satisfactorily dehydrated, recoverable sheet. This is presumably due to the water film which are present among the fibers and prevent the flow of air therethrough. The dehydrated mat is dried appropriately to yield a sheet-like material. It can be dried at a temperature of 80° C. to 200° C. by using a hot air tray column, blowing hot air, contacting the sheet with hot rollers, or otherwise.

The flame retarder can most effectively be incorporated into the slurry immediately prior to the formation of a sheet therefrom from the standpoint of satisfactory dispersion with the binder and improved fireretarding results, though it is also possible to add it into the slurry being prepared, or coat the mat with the flame retarder before it is dried.

The sheet-like material thus obtained can be combined with hydrophobic thermoplastic resin film to form composite building material.

Examples of the thermally adhesive hydrophobic thermoplastic resin films include films of polyvinyl acetate, polyvinyl butylate, polyamide, polyethylene, polypropylene, polyester, polystyrene, an ethylene-vinyl acetate copolymer, an ethylene-(meth)acrylic acid copolymer, and an ionic copolymer. It is also possible to employ a mixture of any such resin with rosin or a derivative thereof, a coumarone-indene resin, a phenol resin, a terpene resin, petroleum wax, chlorinated paraffin, or chlorinated diphenyl. An ionic copolymer known as an ionomer resin is particularly preferred from the standpoint of adhesiveness and workability.

The composite sheet-like building material of this invention can be obtained if any such resin film is heated, and pressed against the sheet-like material, so that the film surface may be fused with the sheet-like material. The composite building material can effectively be combined with an iron or other metal plate. The metal plate can be bonded to the building material very easily and quickly without involving any danger of ignition or the like, if the metal plate is heated to a temperature allowing fusion of the resin film on the building material, and pressed against the resin film. A satisfactory adhesive strength is thereby obtained. The moisture or water of condensation from the sheet-like material does not cause any corrosion of the metal plate, since the resin film is resistant to water, and shuts off any such moisture or water.

A combination of the sheet-like material of this invention with a metal plate, and a combination further including an intermediate layer composed of a polyethylene foam can be bent at an angle of 60° to 90° by corrugating rollers without causing any damage on the sheet-like material. The sheet-like material is excellent in recoverability across its thickness. It is capable of withstanding any such rough handling or fabrication, and is, therefore, particularly suitable for use in the heat insulation, backing, condensation prevention, sound insulation and fire retardation of a corrugated roof. Although the sheet-like material of this invention can be advantageously manufactured by the wet process as hereinabove described, this invention is not limited to the material produced by the wet process, but consists essentially in the construction of the sheet-like material as hereinabove described.

The sheet like material of this invention is excellent in weight reduction, handling convenience, bending workability, fire resistance or retardancy, heat insulation, condensation resistance, sound insulation, vibration damping, heat resistance, water resistance, weatherability and cushiony property, as already pointed out. These characteristics render the material widely applicable in the fields of civil engineering, building, plant equipment, electric appliances, furniture, automobiles and other vehicles, and other fields of industry. More specifically, the applications in the field of civil engineering and construction include fire resistant covering for steel frames in buildings, refractory joints for refractory walls, heat insulation in general for roofs, walls and floors, corrugated roofs, lining for sizing metals on sidewalls, water sealing for warm water pools and bathrooms, lining for metal panels and shelters in stations and halls, flash doors, metal sliding doors, shutters and their storage chambers, backing for deck plates, emergency ladders and other metal floors, cores for sound insulating panels, backing for vinyl chloride cushiony floors, backing for fire retarding walls, and cores for roof sealing materials. Examples of application in the field of plant equipment include heat or cold insulation for pipelines, fire retardation for tanks, backing for air-conditioning ducts, lagging material, backing for air line ducts, sound insulation for dust collectors, backing for incinerators and exhaust ducts, and cushioning for dampers in air-conditioning ducts. Examples of application in the field of machinery and apparatus include backing for gas or oil heaters, sound and heat insulation for air conditioners and boilers, cold insulation for refrigerators and freezing warehouses, vibration damping for rock drills, handy drills, chain saws and riveting machines to thereby prevent a white finger disease, sound insulation and vibration damping for the housings of pumps, ejectors, blowers, ball mills, hoppers, cyclones, oil separators, compressors, dust shooters, sieves, feeders, conveyors, forging machines, presses, cutters, drills, rolling mills and dynamos, and motor covers, and backing for office equipment such as typewriters, line printers for computers and perforators. Examples of the application in the field of domestic electric appliances and furniture include sealing for bathtubs, heat insulation for ovens, ranges and other cooking apparatus, irons, and automatic venders, backing for the condensation prevention and sound insulation of stainless steel basins and bathtubs, sound insulation and vibration damping for refrigerators, air conditioners, coolers, dish washers and their housings and pipings, and motor covers, steel furniture such as desks, cabinets and lockers, and audio apparatus, and packing and sealing for gas-fired appliances. Examples of the application in the field of automobiles include heat insulation for the body ceiling, heat and sound insulation for the partition between the engine room and the driver's compartment, sound insulation for exhaust ducts, sound insulation and vibration damping for doors, lining for the engine locker cover and enclosure plate, fire retardation and heat and sound insulation for the oil pan and the gasoline tank, sound insulative lining for the trunk room, cowling and front hood, and the formation of a sound- and waterproof mat for the floor, a filter in the air cleaner, a brake lining, a clutch facing and gaskets. Examples of the application in the field of heavier vehicles and ships include lining for engine covers, heat insulation for hot water and fuel oil pipelines, heat and sound insulation, and condensation prevention for a residential area, cold insulation for freezers in freezing vessels and vehicles, sound insulation for the sidewalls and ceilings of subways, sound insulation for the engine rooms of motorboats and fishing boats, sound insulation for the wheel shelters of trains and subways, and decks, and rust-preventive backing for decks. Other examples of application include flap lids for open hearth furnaces, converters, and electric furnaces, sealing material for molds, and sound insulation and vibration damping for jet engines on aircrafts. All of these examples of applications employ the sheet-like material of this invention alone. The sheet-like material of this invention can also be used as a facing for any conventional insulating material composed of an organic foam such as a polyethylene, polystyrene or polyurethane foam to improve its inflammability. An appropriate combination can convert any such conventional material to a non-inflammable material, and render it usable for a drastically wider range of applications.

The sheet-like material of this invention, or a combination thereof with a thin metal plate is sufficiently high in fire resistance to be acceptable as a "non-inflammable material" in accordance with the test specified by Japanese Ministry of Construction Notice No. 1828 of 1970 and 1231 of 1976. A corrugated roof employing the sheet-like material as a heat insulating material is sufficiently high in fire retardancy to be acceptable as a "roof capable of fire retardation for 30 minutes" in accordance with the test specified by Japanese Ministry of Construction Notice No. 2999 or 1969. The sheet-like material has a thermal conductivity of 0.03 to 0.06 kcal/mh° C., and is superior in heat insulation. Accordingly, it is particularly effective to use the sheet-like material of this invention for heat insulating purposes. The sheet-like material has an acoustic absorptivity of about 0.6 for a sound at 1,000 Hz if it has a thickness of 10 mm, and about 0.8 if it has a thickness of 25 mm. It is also superior in weatherability to any conventional glass or rock wool. It does not show any appreciable change in appearance or thickness after 500 hours of continuous radiation in a weathering test, while the conventional glass or rock wool reduces its thickness to about one-third. Thus, the sheet-like material of this invention satisfies all of the requirements imposed on building and heat insulating materials, and is widely usable for a variety of applications, including those not specifically mentioned before.

The invention will now be described more specifically with reference to several examples which are not intended to limit the scope of this invention. In the following examples, parts are shown by weight unless otherwise noted.

EXAMPLE 1

A slurry was prepared by dissolving in 18,000 parts of water, 108 parts of a carboxyl-modified ethylene-vinyl acetate copolymer emulsion having a glass transition point of $-10°$ and a solids content of 50% by weight as a thermoplastic resin, 25 parts of a polyamide epichlorohydrin resin solution having a solids content of 30% by weight as a crosslinking agent, 5 parts of a nonionic surfactant solution containing 10% by weight of polyoxyethylene nonylphenol ether as a foam stabilizer, and 15 parts of a polyacrylamide solution having a concentration of 0.2% by weight as a coagulant, and dispersing 180 parts of granular rock wool in the solution. The slurry was stirred slowly for 30 minutes. The slurry was conveyed by a displacement type rotary pump to a sheet-forming station at a constant rate, and caused to flow down onto a slantingly traveling 50-mesh stainless steel net along a guide chute mounted at an angle of 30° thereto, whereby a wet mat is formed on the net. After a large excess of white water had, for the greater part, been removed through the net, the wet mat was passed between a pair of rollers having a prescribed nip therebetween, whereby its surfaces were smoothed, and its thickness was made uniform. Then, it was transferred to a vacuum dehydrating zone, and dehydrated until its water content was reduced to 100% by weight (based on a dry sheet). It was finally dried on both surfaces by hot air having a temperature of 150° C. for 20 minutes to yield a sheet-like material having a thickness of 5.3 mm and an apparent density of 0.16 g/cm$^3$. The sheet-like material was found to have an average binder content of 8.4% by weight, and a very uniform binder distribution across its thickness as shown in TABLE 1. The fibrous substance was found to have an interlayer orientation of 14°. The sheet-like material showed a thermal conductivity of 0.034 kcal/mh° C. when tested at 25° C. in accordance with the procedures of JIS A1412, and an acoustic absorptivity of 0.35 when tested at 1,000 Hz in accordance with the procedures of JIS A1409. It was excellent as a heat or sound insulating material.

The sheet-like material, which had been prepared in an elongated shape, was continuously bonded to a colored iron plate having a thickness of 0.6 mm by a laminater using a chloroprene adhesive having a solids content of 23% by weight, and applying it at a rate of 150 g/m$^2$. The resulting laminate was formed by a roller type corrugating machine into a roof #500 having a net width of 500 mm and a corrugation height of 150 mm. It could be corrugated quite satisfactorily without developing any damage or chipping at any corner. The material was satisfactorily resilient in any portion brought into contact with the rollers. It was a roof material which was entirely free from any defect in appearance. It did not show any change in appearance after 500 hours of a weathering test conducted in accordance with the method of JIS A1415. The composite thus obtained was found acceptable as being non-inflammable as a result of a fire resistance test according to Japanese Ministry of Construction Notice No. 1828 of 1970. The surface test indicated a td$\theta$ value of 0, CA was 13.1, and the base test indicated a temperature difference of $-24°$ C.

EXAMPLE 2

A slurry was prepared substantially in accordance with the procedures of EXAMPLE 1 by dissolving in 18,000 parts of water, 150 parts of styrene-acrylic ester copolymer emulsion having a glass transition point of $-6°$ C. and a solids content of 45% by weight, as well as 45 parts of the cross linking agent employed in EXAMPLE 1, and the foam stabilizer and the coagulant of EXAMPLE 1 in the same quantities as in EXAMPLE 1, and dispersing 135 parts of granular rock wool and 15 parts of chopped glass strands having a cut length of 13 mm. The slurry was caused to flow down onto a stainless steel net at an angle of 45° to form a wet mat thereon. When the slurry was flowing down the guide chute, a flame retarder was added into the slurry uniformly at a rate of 60 g/m$^2$. The retarder was a mixed powder containing in a weight ratio of 1:2 antimony trioxide and pentabromomethylbenzene having a decomposition temperature of above 370° C. and a bromine content of 82% by weight. The procedures of EXAMPLE 1 were repeated to yield a sheet-like material having a thickness of 9.8 mm and an apparent density of 0.14 g/cm³. It was found to have an average binder content of 7.6% by weight, and a uniform binder distribution across its thickness as shown in TABLE 1. It has an interlayer fiber orientation of 23°, a thermal conductivity of 0.032 kcal/mh° C. and an acoustic absorptivity of 0.68 at 1,000 Hz. The sheet-like material was found acceptable as being non-inflammable as a result of a test according to the aforesaid Notice No. 1828. The surface test indicated a td$\theta$ value of 0, CA was 9.5, and the base test indicated a temperature difference of 41° C.

EXAMPLE 3

A slurry was prepared by dissolving in 18,000 parts of water, 108 parts of a carboxyl-modified ethylene-vinyl acetate copolymer emulsion having a glass transition temperature of −10° C. and a solids content of 50% by weight as a thermoplastic resin, 25 parts of a polyamide epichlorohydrin resin solution having a solids content of 30% by weight as a crosslinking agent, 5 parts of a nonionic surfactant solution containing 10% by weight of polyoxyethylene nonylphenol ether as a foam stabilizer, and 15 parts of a polyacrylamide solution having a concentration of 0.2% by weight as a coagulant, and dispersing 180 parts of granular rock wool in the solution. The slurry was stirred slowly for 30 minutes. The slurry was conveyed by a displacement type rotary pump to a sheet-forming station at a constant rate, and caused to flow down onto a slantingly traveling 50-mesh stainless steel net along a guide chute mounted at an angle of 30° thereto, while white water was blown into the slurry from below the guide chute immediately prior to the transfer of the slurry from the guide chute to the net. A flame retarder was added uniformly to the slurry on the guide chute at a rate of 50 g/m². It was a mixed powder containing in a weight ratio of 1:2, antimony trioxide and pentabromomethylbenzene having a decomposition temperature of above 370° C. and a bromine content of 82% by weight. After a large excess of white water had, for the greater part, been removed through the net, the wet mat was passed between a pair of rollers having a prescribed nip therebetween, whereby its surfaces were smoothed, and its thickness was made uniform. Then, the mat was transferred to a vacuum dehydrating zone, and dehydrated until its water content was reduced to 100% by weight (based on a dry sheet). The mat was finally dried on both sides by hot air having a temperature of 150° C. for 20 minutes to yield a sheet-like material having a thickness of 8.0 mm and an apparent density of 0.10 g/cm³. It was found to have an average binder content of 5.3% by weight, and a very uniform binder distribution across its thickness as shown in TABLE 1. It has an interlayer fiber orientation of 50°. It showed a thermal conductivity of 0.034 kcal/mh° C. when tested at 25° C. according to the method of JIS A1412, and an acoustic absorptivity of 0.35 when tested at 1,000 Hz according to JIS A1409. It was, thus, found excellent as a heat or sound insulating material.

The sheet-like material, which had been prepared in an elongated shape, was bonded continuously to a colored iron plate having a thickness of 0.6 mm by a laminater using a chloroprene adhesive having a solids content of 23% by weight, and applying it at a rate of 150 g/m². The laminate was formed by a roller type corrugating machine into a roof #500 having a net width of 500 mm and a corrugation height of 150 mm. It could be corrugated quite satisfactorily without developing any damage or chipping at any corner. The material was satisfactorily resilient in any portion that had been brought into contact with the rollers. It was a roof material which was entirely free from any defect in appearance. It did not show any change in appearance after 500 hours of a weathering test according to JIS A1415. The composite was found acceptable as being non-inflammable as a result of a fire resistance test according to Japanese Ministry of Construction Notice No. 1828 of 1970. The surface test indicated a td$\theta$ value of 0, CA was 15.5, and the base test indicated a temperature difference of −18° C.

EXAMPLE 4

A slurry was prepared substantially in accordance with the procedures of EXAMPLE 1 by dissolving in 18,000 parts of water, 150 parts of a styrene-acrylic ester copolymer emulsion having a glass transition point of −6° C. and a solids content of 45% by weight, as well as 45 parts of the crosslinking agent employed in EXAMPLE 1, and the foam stabilizer and the coagulant of EXAMPLE 1 in the quantities employed in EXAMPLE 1, and dispersing 135 parts of granular rock wool and 15 parts of chopped glass strands having a cut length of 13 mm. The slurry was formed into a wet mat on a traveling stainless steel net substantially as described in EXAMPLE 1. A flame retarder was added into the slurry on the guide chute uniformly at a rate of 60 g/m². It was a mixed powder containing in a weight ratio of 1:2 antimony trioxide and pentabromomethylbenzene having a decomposition temperature of above 370° C. and a bromine content of 82% by weight. The procedures of EXAMPLE 1 were repeated thereafter to yield a sheet-like material having a thickness of 16.2 mm and an apparent density of 0.11 g/cm³. It had an average binder content of 8.6% by weight, and a uniform binder distribution across its thickness as shown in TABLE 1. It had an interlayer fiber orientation of 70°, a thermal conductivity of 0.032 kcal/mh° C., and an acoustic absorptivity of 0.68 at 1,000 Hz. It was found acceptable as being non-inflammable as a result of a test according to the aforesaid Ministry of Construction Notice. The surface test indicated a td$\theta$ value of 0, CA was 12.0, and the base test indicated a temperature difference of −20° C.

COMPARATIVE EXAMPLE 1

A slurry was prepared exactly in accordance with the procedures of EXAMPLE 1. The slurry was fed to an ordinary fourdrinier sheetmaking machine, and dropped at right angles onto a horizontally traveling net to form a wet mat. The mat was very poor in surface smoothness, and had to be passed between rollers repeatedly to form a sheet-like material having a uniform thickness. As a result, the sheet had a high density. The fibrous substance was very uneven, and the mat could not be dehydrated effectively, resulting in a large quantity of the binder remaining in the sheet-like material. After it had been dried, the sheet-like material had a thickness of 3.2 mm, an apparent density of 0.35 g/cm³, and an average binder content of 21.5% by weight. Although it had a relatively uniform binder distribution as shown in TABLE 1, it had an interlayer fiber orientation of 0, and was stiff, despite its high binder content.

It was laminated on a colored iron plate having a thickness of 0.6 mm, and when the laminate was corrugated, the sheet-like material developed cracks. Neither the sheet-like material nor a combination thereof with a steel plate was acceptable as being non-inflammable as a result of a fire resistance test according to the aforesaid Ministry of Construction Notice. The sheet-like material had a thermal conductivity of 0.069 kcal/mh° C. It had a very rough surface impairing its appearance, and was unsuitable as a heat insulating material for a corrugated roof.

COMPARATIVE EXAMPLE 2

A slurry was prepared by dispersing uniformly in 5,000 parts of water, 200 parts of granular rock wool, 200 parts of completely saponified polyvinyl alcohol having a concentration of 10% by weight, 200 parts of corn starch having a concentration of 10% by weight, and 2.0 parts of a cationic surfactant. A wet mat was formed from the slurry in accordance with the procedures of COMPARATIVE EXAMPLE 1. The mat was subjected to vacuum dehydration and roller press dehydration, and dried by hot air to yield a sheet-like material having a thickness of 7.5 mm and an apparent density of 0.40 g/cm$^3$. It was a sheet-like material made by a conventional method of making rock wool ceiling boards. As the binder had not been crosslinked in the sheet, the binder underwent heavy migration to the surfaces of the sheet when the sheet was dried, and the sheet had a nonuniform binder distribution as shown in TABLE 1. It had an interlayer fiber orientation of 0, and was stiff and low in interlayer strength. It developed cracking on the surface, and layer separation when corrugated, and was unsuitable as a heat insulating material for corrugated plates.

COMPARATIVE EXAMPLE 3

A slurry was prepared by adding 100 parts of granular rock wool and three parts of a cationic surfactant containing 10% by weight of dioxyethylenestearylamine into 10,000 parts of water, heating and dispersing the rock wool by a beater for 30 seconds, adding 10 parts of the crosslinking agent employed in EXAMPLE 1 as a fixing agent while stirring the solution, and adding 60 parts of a polyvinyl acetate resin emulsion having a glass transition point of 35° C. and a solids content of 45% by weight while stirring the solution. The procedures of COMPARATIVE EXAMPLE 1 were repeated to form the slurry into a wet mat, and dehydrate and dry it to yield a sheet-like material having a thickness of 1.7 mm and an apparent density of 0.49 g/cm$^3$. It was a sheet-like material made in accordance with the known method disclosed in Japanese Patent Publication No. 43485/1974. The use of a cationic surfactant enabled satisfactory dispersion resulting disadvantageously in a high apparent density. The use of a beater unavoidably gave rise to the breakage of the fibers, and did not allow them to get intertwined. The use of an ordinary sheetmaking process employing a long net resulted in an interlayer fiber orientation of 0. The sheet-like material was, therefore, stiff and brittle like paper. It was unsuitable for corrugation, as it cracked when tested for corrugation in accordance with the procedures of EXAMPLE 1. Thus, the process of Japanese Patent Publication No. 43485/1974 produces only a sheet-like material which is inferior in fiber orientation and other respects and fails to produce the sheet-like material of this invention.

COMPARATIVE EXAMPLE 4

A homogeneous wet mat was prepared by scattering 25 parts of an aqueous sodium silicate solution #1 having a concentration of 40% by weight on 100 parts of continuously dropping opened Canadian chrysotile asbestos (3 class) to form a mat, and roller pressing it. The wet mat was dried at 160° C. for about 40 minutes in a hot air drier to yield a sheet-like material having a thickness of 5.0 mm and an apparent density of 0.09 g/cm$^3$. The use of an inorganic binder disabled the determination of the binder distribution in the sheet-like material by the method as hereinbefore described. The sheet-like material, however, showed heavy migration of the binder to the surface, was stiff, and got torn when it was corrugated. It was inferior in weatherability. It broke and scattered after only 200 hours of a weathering test. It is inferior as a building or heat insulating material to the sheet-like material of this invention.

EXAMPLE 5

A slurry was prepared by dissolving in 18,000 parts of water, 108 parts of a carboxyl-modified ethylenevinyl acetate copolymer emulsion having a glass transition point of −10° C. and a solids content of 50% by weight as a thermoplastic resin, 25 parts of a polyamide epichlorohydrin resin solution having a solids content of 30% by weight as a crosslinking agent, five parts of a nonionic surfactant solution containing 10% by weight of polyoxyethylenenonyl phenol ether as a foam stabilizer, and 15 parts of a polyacrylamide solution having a concentration of 0.2% by weight as a coagulant, and dispersing 200 parts of 6 mm long chopped glass strands in the solution. The slurry was stirred slowly for 30 minutes. The slurry was fed by a displacement type rotary pump to a sheeting station at a constant rate, and caused to flow down onto a slantingly traveling 50-mesh stainless steel net along a guide chute mounted at an angle of 30° to form a wet mat. After a large excess of white water had, for the greater part, been removed through the net, the wet mat was passed between a pair of rollers having a prescribed nip therebetween, whereby its surfaces were smoothed and its thickness was rendered uniform. Then, the mat was transferred to a vacuum dehydrating zone, and dehydrated until its water content had been reduced to 100% by weight (based on a dry sheet). The mat was finally dried on both sides by hot air having a temperature of 150° C. for 50 minutes to yield a sheet-like material having a thickness of 10.5 mm and an apparent density of 0.18 g/cm$^3$. It had an average binder content of 5.3% by weight, and a very uniform binder distribution across its thickness as shown in TABLE 1. It had an interlayer fiber orientation of 17°. It showed a thermal conductivity of 0.038 kcal/mh° C. when tested at 25° C. in accordance with JIS A1412, and an acoustic absorptivity of 0.53 when tested at 1,000 Hz in accordance with JIS A1409. It was, thus, a sheet-like material which was excellent as a heat or sound insulating material.

The sheet-like material, which had been prepared in an elongated shape, was bonded continuously to a colored iron plate having a thickness of 0.6 mm by a laminater using a chloroprene adhesive having a solids content of 23% by weight, and applying it at a rate of 150 g/m$^2$. The laminate was formed by a roller type corrugating machine into a roof #500 having a net width of 500 mm and a corrugation height of 150 mm. It could be corrugated quite satisfactorily without developing any chipping or tearing at any corner. The material was satifactorily resilient in any portion that had been brought into contact with the rollers. It was a material which was entirely free from any defect in appearance as a roof material. It did not show any change in appearance after 500 hours of a weathering test according to JIS A1415. The composite was found acceptable as being non-inflammable as a result of a fire resistance test pursuant to Japanese Ministry of Construction Notice No. 1828 of 1970. The surface test indicated a $td\theta$ value of 0, CA was 21.5, and the base test indicated a temperature difference of $-35°$ C.

PLE 1 having a thickness of 5.3 mm and an apparent density of 0.16 g/cm$^3$, and a colored iron plate having a thickness of 0.6 mm, and also from a composite corrugated roof material formed by employing a polyethylene foam sheet having a thickness of 4.0 mm and an apparent density of 0.024 g/cm$^3$. Each sample was tested as a top cover for a large container placed at an ambient temperature of 30° C. and a relative humidity of 95 to 100% so that the heat insulating material might face the interior of the container, while cooling water having a temperature of 3.5° C. to 5.0° C. was supplied to the iron plate side of the sample, whereby a conden-

TABLE 1

| | Thickness (mm) | Apparent density (g/cm$^3$) | Binder distribution (wt %) | | | | | | Degree of orientation of fibrous material (°) | Cleavage strength (g/cm$^3$) | Bending workability |
| --- | --- | --- | --- | --- | --- | --- | --- | --- | --- | --- | --- |
| | | | 1 | 2 | 3 | 4 | 5 | average | | | |
| EXAMPLE 1 | 5.3 | 0.16 | 8.7 | 8.4 | 7.9 | 8.3 | 8.6 | 8.4 | 14 | 186 | Good |
| EXAMPLE 2 | 9.8 | 0.14 | 10.7 | 7.8 | 6.2 | 6.4 | 6.8 | 7.6 | 23 | 151 | — |
| EXAMPLE 3 | 8.0 | 0.10 | 5.8 | 5.3 | 5.2 | 5.0 | 5.1 | 5.3 | 50 | 350 | Good |
| EXAMPLE 4 | 16.2 | 0.11 | 9.2 | 8.5 | 8.2 | 8.3 | 8.7 | 8.6 | 70 | 320 | — |
| EXAMPLE 5 | 10.5 | 0.18 | 7.2 | 5.1 | 4.1 | 4.5 | 5.6 | 5.3 | 17 | — | Good |
| COMPARATIVE EXAMPLE 1 | 3.2 | 0.35 | 25.4 | 21.6 | 20.8 | 17.3 | 22.5 | 21.5 | 0 | more than 300 | Poor |
| COMPARATIVE EXAMPLE 2 | 7.5 | 0.40 | 30.5 | 3.2 | 0.8 | 1.8 | 8.6 | 9.0 | 0 | 4.3 | Poor |
| COMPARATIVE EXAMPLE 3 | 1.7 | 0.49 | 7.3 | 4.2 | 6.5 | 5.5 | 4.6 | 5.6 | 0 | 283 | Poor |

EXAMPLE 6

A slurry was prepared by dissolving 23 parts of the thermoplastic resin emulsion, 5 parts of the crosslinking solution, 5 parts of the foam stabilizer solution and 15 parts of the coagulant solution, all of which were equal to those employed in EXAMPLE 1, in 18,000 parts of water containing the white water recovered from the filtration and dehydration steps of EXAMPLE 1, and adding 150 parts of granular rock wool and six parts of chrysotile asbestos (class 5). The slurry was fed by two rotary pumps to two outlets, and caused to flow down onto a traveling net along two guide chutes mounted each at an angle of 30° thereto. A glass fiber net having a mesh size of 5 mm was incorporated into a mat through the clearance between the first and second guide chutes. A flame retarder was added uniformly to the slurry at a rate of 45 g/m$^2$ substantially as described in EXAMPLE 2. It was a mixed powder containing in a weight ratio of 1:5 antimony trioxide and tetrabromobisphenol A having a decomposition temperature of 320° C. and a bromine content of 59% by weight. The procedures of EXAMPLE 1 were thereafter repeated to yield a sheetlike material having a thickness of 2.1 mm, an apparent density of 0.33 g/cm$^3$, a binder content of 5.3% by weight and a fiber orientation of 5°. As the sheetlike material was reinforced with a glass fiber net, it was very strong, and had a tensile strength of about 50 kg/cm$^2$ and an elongation of about 4%. It was found acceptable as being flame retardant according to a two-minute heating test pursuant to Article 4-3 of Rules of Practice of the Fire Services Act. It is widely usable as a ceiling material for a bathroom or kitchen, and as a ceiling or wall material for a public building. It is also useful as a packing material for a cushion floor or the like.

EXAMPLE 7

Samples were cut from a composite corrugated roof material composed of the sheet-like material of EXAMsation test simulating winter was conducted. The time which had passed before the water condensed on the heat insulating material finally dropped was measured. It was about 17 hours in the case of the sheet-like material of this invention, and only three hours in the case of the polyethylene foam. The sheet-like material of this invention was found superior in the prevention of condensation by virtue of its moisture absorbing and releasing characteristics, though it was comparable or somewhat inferior in thermal conductivity.

EXAMPLE 8

A sheet-like material of the composition described in EXAMPLE 2, and prepared in accordance with the procedures of EXAMPLE 2 and having a thickness of 5.1 mm and an apparent density of 0.14 g/cm$^3$ was combined with a galvanized iron plate having a thickness of 0.8 mm by a chloroprene adhesive. The laminate was corrugated into a heat insulating roof material having a corrugation height of 150 mm and a net width of 500 mm. A sample was cut from the roof material, and when the heat insulating material side of the sample was heated to 840° C. in 30 minutes in accordance with an indoor first-class heating curve pursuant to Japanese Ministry of Construction Notice No. 2999 to 1969, the rear or iron plate side had only a maximum surface temperature of 430° C., and did not become red hot, nor was it deformed. The sheet-like material did not peel off, nor was it broken. It was sufficiently fire resistant to be acceptable as being suitable for a roof capable of fire retardation for 30 minutes.

EXAMPLE 9

A slurry was prepared by dissolving in 18,000 parts of water, 108 parts of a carboxyl-modified ethylenevinyl acetate copolymer emulsion having a glass transition point of $-10°$ C. and a solids content of 50% by weight as a thermoplastic resin, 25 parts of a polyamide epichlorohydrin resin solution having a solids content of 30% by weight as a crosslinking agent, 5 parts of a nonionic surfactant solution containing 10% by weight of polyoxyethylenenonyl phenol ether as a foam stabilizer, and 15 parts of a polyacrylamide solution having a concentration of 0.2% by weight as a coagulant, and dispersing 180 parts of granular rock wool in the solution. The slurry was stirred slowly for 30 minutes. The slurry was fed by a displacement type rotary pump to a sheet forming station at a constant rate, and caused to flow down onto a slantingly traveling 50-mesh stainless steel net along a guide chute mounted at an angle of 30° thereto, while white water was blown into the slurry from below the guide chute immediately prior to the transfer of the slurry from the guide chute to the net. After a large exces of white water had, for the greater part, been removed through the net, the wet mat was passed between a pair of rollers having a prescribed nip, whereby its surfaces were smoothed and its thickness was rendered uniform.

Then, the mat was transferred to a vacuum dehydrating zone, and dehydrated until its water content had been reduced to 100% by weight (based on a dry sheet). It was finally dried on both sides by hot air having a temperature of 150° C. for 20 minutes to yield a sheet-like material having a thickness of 8.5 mm and an apparent density of 0.11 g/cm$^3$. It had an average binder content of 8.4% by weight, and an interlayer fiber orientation of 55°. It showed a thermal conductivity of 0.034 kcal/mh°C. when tested at 25° C. according to JIS A1412, and an acoustic absorptivity of 0.34 when tested at 1,000 Hz according to JIS A1409. It was, thus, excellent as a heat or sound insulating material.

The sheet-like material, which had been prepared in an elongated shape, was bonded continuously to a colored iron plate having a thickness of 0.6 mm by a laminater using a chloroprene adhesive having a solid content of 23% by weight, and applying it at a rate of 150 g/m$^2$. The laminate was formed by a roller type corrugating machine into a roof #500 having a net width of 500 mm and a corrugation height of 150 mm. It could be corrugated quite satisfactorily without developing any chipped or torn corners. The material was satisfactorily resilient in any portion that had been brought into contact with the rollers. It was a roof material which was entirely free from any defect in appearance. It did not show any change in appearance after 500 hours of a weathering test pursuant to JIS A1415. The composite was found acceptable as being non-inflammable as a result of a fire resistance test pursuant to Japanese Ministry of Contruction Notice No. 1828 of 1970. The surface test indicated a td$\theta$ value of 0, CA was 9.0, and the base test indicated a temperature difference of −15° C.

EXAMPLE 10

Samples were cut from a composite corrugated roof material comprising the sheet-like material of EXAMPLE 1 having a thickness of 8.0 mm and an apparent density of 0.10 g/cm$^3$, and a colored iron plate having a thickness of 0.6 mm, and also from a composite corrugated roof material prepared by employing a polyethylene foam sheet having a thickness of 8.0 mm and an apparent density of 0.024 g/cm$^3$ as a heat insulating material. Each sample was tested as a top cover for a large container controlled at an ambient temperature of 30° C. and a relative humidity of 95 to 100% so that the heat insulating material might face the interior of the container, while coolling water having a temperature of 3.5° C. to 5.0° C. was supplied to the rear or iron plate side of the sample, whereby a dewing test simulating winter was conducted. The time which had passed before the water condensed on the heat insulating material finally dropped was measured. It was about 23 hours in the case of the material according to this invention, and only eight hours in the case of the polyethylene foam. The material of this invention was found superior in the prevention of condensation by virtue of its excellent moisture absorbing and releasing characteristics, though it was comparable or somewhat inferior in thermal conductivity.

EXAMPLE 11

A sheet-like material of the composition described in EXAMPLE 1, prepared in accordance with the procedures of EXAMPLE 1 and having a thickness of 8.2 mm and an apparent density of 0.11 g/cm$^3$ was combined with a galvanized iron plate having a thickness of 0.8 mm by a chloroprene adhesive. The laminate thus obtained was corrugated into a heat insulating roof material having a corrugation height of 150 mm and a net width of 500 mm. A sample was cut from the roof material, and when the heat insulating material side of the sample was heated to 840° C. in 30 minutes in accordance with an indoor first-class heating curve pursuant to Japanese Ministry of Construction Notice No. 2999 of 1969, the rear or iron plate side of the sample had only a maximum temperature of 405° C., and did not become red hot, nor was it deformed. The sheet-like material did not peel off, nor was it broken. It was sufficiently fire resistant to be acceptable for a roof capable of fire retardation for 30 minutes.

What is claimed is:

1. A sheet-like material comprising 80 to 97% by weight of a non-inflammable fibrous substance, and 3 to 20% by weight of a binder consisting essentially of a thermoplastic resin, said fibrous substance being orientated at an angle of 3° to 80°, said material having an intermediate layer containing at least 2% by weight of said binder and at least 25% of the average quantity of said binder in said material.

2. A sheet-like material as set forth in claim 1, wherein said fibrous substance is selected from the group consisting of asbestos, rock wool, glass fibers, ceramic fibers, aluminous fibers, carbon fibers, and mixtures thereof.

3. A sheet-like material as set forth in claim 1, wherein said thermoplastic resin has a glass transition temperature of −50° to 30°.

4. A sheet-like material as set forth in claim 1, wherein said resin is a self-crosslinking type resin.

5. a sheet-like material as set forth in claim 1, wherein said binder contains a crosslinking agent for said resin in the quantity of 0.1 to 30% by weight of said resin.

6. A sheet-like material as set forth in claim 1, which contains 3 to 15% by weight of said binder.

7. A sheet-like material as set forth in claim 1, wherein said fibrous substance is orientated at an angle of 5° to 30°.

8. A sheet-like material as set forth in claim 7, wherein said fibrous substance is orientated at an angle of 10° to 30°.

9. A sheet-like material as set forth in claim 1, which has a thickness of 0.5 to 25 mm, and an apparent density of 0.08 to 0.4 g/cm$^3$.

10. A sheet-like material as set forth in claim 1, wherein said fibrous substance is orientated at an angle of 31° to 80°.

11. A sheet-like material as set forth in claim 10, wherein said fibrous substance is orientated at an angle of 40° to 70°.

12. A sheet-like material as set forth in claim 1, which has a thickness of 0.5 to 50 mm, and an apparent density of 0.04 to 0.2 g/cm$^3$.

13. A sheet-like material as set forth in claim 1, wherein said binder additionally contains, for 100 parts by weight thereof, 5 to 50 parts by weight of an antimony compound and 10 to 100 parts by weight of an aromatic bromine compound.

14. A sheet-like material as set forth in claim 13, wherein said antimony compound is selected from the group consisting of antimony trioxide, antimony pentachloride, antimony trichloride and antimony trisulfide, and mixtures thereof.

15. A sheet-like material as set forth in claim 13, wherein said bromine compound is selected from the group consisting of tetrabromobenzene, pentabromomethylbenzene, hexabromobenzene, hexabromodiphenyl ether, decabromodiphenyl ether and tetrabromobisphenol A, and a mixture thereof, and has a decomposition temperature of above 280° C., and a bromine content of at least 50% by weight.

16. A sheet-like material as set forth in claim 13, wherein sad antimony compound and said bromine compound have a weight ratio of 1:1 to 1:10.

17. A heat insulating material comprising a sheet-like material containing 80 to 97% by weight of a non-inflammable fibrous substance, and 3 to 20% by weight of a binder consisting essentially of a thermoplastic resin, said fibrous substance being orientated at an angle of 3° to 80°, said sheet-like material having an intermediate layer containing at least 2% by weight of said binder and at least 25% of the average quantity of said binder in said sheet-like material.

18. A heat insulating material as set forth in claim 17, which contains 3 to 15% by weight of said binder.

19. A heat insulating material as set forth in claim 17, wherein sad fibrous substance is orientated at an angle of 5° to 30°.

20. A heat insulating material as set forth in claim 17, wherein said fibrous substance is orientated at an angle of 10° to 30°.

21. A heat insulating material as set forth in claim 17, wherein said sheet-like material has a thickness of 0.5 to 25 mm, and an apparent density of 0.08 to 0.4 g/cm$^3$.

22. A heat insulating material as set forth in claim 17, wherein said fibrous substance is orientated at an angle of 31° to 80°.

23. A heat insulating material as set forth in claim 17, wherein said fibrous substance is orientated at an angle of 40° to 70°.

24. A heat insulating material as set forth in claim 17, wherein said sheet-like material has a thickness of 0.5 to 25 mm, and an apparent density of 0.08 to 0.4 g/cm$^3$.

25. A heat insulating material as set forth in claim 17, wherein said sheet-like material further contains a flame retarder which consists of 5 to 50 parts by weight of an antimony compound, and 10 to 100 parts by weight of an aromatic bromine compound for 100 parts by weight of said binder.

26. A method of manufacturing a sheet-like material having exellent fire resistance and bending workability, said material comprising 80 to 97% by weight of a non-inflammable fibrous substance, and 3 to 20% by weight of a binder consisting essentially of a thermoplastic resin, said fibrous substance beinhg orientated at an angle of 3° to 30°, said material having an intermediate layer containing at least 2% by weight of said binder and at least 25% of the average quantity of said binder in said material, said method comprising:
dissolving in water a binder consisting essentially of a water-soluble thermoplastic resin or a thermoplastic resin in the form of an emulsion or latex, and a crosslinking agent for said resin or a high polymer coagulant;
dispersing a non-inflammable fibrous substance therein to prepare a slurry;
feeding said slurry to a traveling or rotating carrier net or porous carrier sheet at an angle of 5° to 60° to form a wet mat thereon;
dehydrating said mat; and
drying said mat.

27. A method as set forth in claim 26, wherein said slurry is fed to said carrier net or sheet at an angle of 20° to 45° therto.

28. A method as set forth in claim 26, further including adding a flame retardant to said slurry immediately prior to the formation of said mat.

29. A method as set forth in claim 26 further including adding a foam stabilizing surfactant when preparing said slurry.

30. A method of manufacturing a sheet-like material having excellent fire resistance and bending workability, said material comprising 80 to 97% by weight of a non-inflammable fibrous substance, and 3 to 20% by weight of a binder consisting essentially of a thermoplastic resin, said fibrous substance being orientated at an angle of 31° to 80°, said material having an intermediate layer containing at least 2% by weight of said binder and at least 25% of the average quantity of said binder in said material, said method comprising:
dissolving in water a binder consisting essentially of a water-soluble thermoplastic resin or a thermoplastic resin in the form of an emulsion or latex, as well as a crosslinking agent for said resin or a high polymer coagulant;
dispersing a non-inflammable fibrous substance therein to prepare a slurry;
feeding said slurry to a traveling or rotating carrier net or porous carrier sheet, while blowing a liquid or gas into said slurry to create turbulence therein, to form a wet mat on said carrier net or sheet;
dehydrating said mat; and
drying said mat.

31. A method as set forth in claim 30, wherein said slurry is fed to said carrier net or sheet at an angle of 20° to 45° therto.

32. A method as set forth in claim 30, further including adding a flame retarder to said slurry immediately prior to the formation of said mat.

33. A method as set forth in claim 30, further including adding a foam stabilizing surfactant when preparing said slurry.

* * * * *

UNITED STATES PATENT AND TRADEMARK OFFICE
CERTIFICATE OF CORRECTION

PATENT NO. : 4,433,020
DATED : February 21, 1984
INVENTOR(S) : H. Narukawa, et. al.

It is certified that error appears in the above-identified patent and that said Letters Patent is hereby corrected as shown below:

In Claim 3, line 3, after "30°" and before the period (.), insert --C.--.

In Claim 16, line 2, "sad" should read --said--.

In Claim 19, line 2, "sad" should read --said--.

In Claim 26, line 2, "exellent" should read --excellent--; same Claim, line 6, "beinhg" should read --being--.

In Claims 27 and 31, line 3 of each, "therto" should read --thereto--.

Signed and Sealed this

Twentieth Day of August 1985

[SEAL]

Attest:

DONALD J. QUIGG

Attesting Officer — Acting Commissioner of Patents and Trademarks